US012657439B2

(12) United States Patent
Venkataramani et al.

(10) Patent No.: US 12,657,439 B2
(45) Date of Patent: Jun. 16, 2026

(54) FUSED CONVOLUTIONS FOR FAST DEEP NEURAL NETWORK

(71) Applicant: International Business Machines Corporation, Armonk, NY (US)

(72) Inventors: Swagath Venkataramani, White Plains, NY (US); Sarada Krithivasan, White Plains, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 17/974,358

(22) Filed: Oct. 26, 2022

(65) Prior Publication Data

US 2024/0143982 A1     May 2, 2024

(51) Int. Cl.
| | |
|---|---|
| *G06N 3/00* | (2023.01) |
| *G06N 3/044* | (2023.01) |
| *G06N 3/0464* | (2023.01) |
| *G06N 3/048* | (2023.01) |
| *G06N 3/063* | (2023.01) |

(Continued)

(52) U.S. Cl.
CPC ............ *G06N 3/048* (2023.01); *G06N 3/044* (2023.01); *G06N 3/0464* (2023.01); *G06N 3/063* (2013.01); *G06N 3/08* (2013.01); *G06N 20/00* (2019.01)

(58) Field of Classification Search
CPC ........ G06F 13/28; G06N 3/084; G06N 3/044; G06N 3/063; G06N 3/045; G06N 3/08; G06N 3/0464; G06N 3/09; G06N 20/00; G06T 9/002
See application file for complete search history.

(56) References Cited

U.S. PATENT DOCUMENTS

| | | | | |
|---|---|---|---|---|
| 9,779,786 B1 * | 10/2017 | Wu | ...................... | G06V 10/955 |
| 10,699,447 B2 | 6/2020 | Dwivedi | | |
| 10,706,498 B2 | 7/2020 | Nurvitadhi et al. | | |

(Continued)

FOREIGN PATENT DOCUMENTS

| | | | |
|---|---|---|---|
| WO | WO2018154494 A1 * | 8/2018 | |
| WO | WO 2020069239 A1 * | 4/2020 | |

(Continued)

OTHER PUBLICATIONS

David Beniaguev et al., "Single cortical neurons as deep artificial neural networks", vol. 109, Issue 17p. 2727-2739.e3 Sep. 1, 2021, 2727-2739.*

(Continued)

*Primary Examiner* — Srirama Channavajjala
(74) *Attorney, Agent, or Firm* — Caleb D. Wilkes

(57) ABSTRACT

Fused channel and/or fused filter convolutions for fast deep neural network execution are provided. In one aspect, a system includes: a processor, connected to a memory, configured to: implement an approximated datapath in a deep neural network having a sequence of adders and multipliers for adding up operands to provide accumulated sums for two or more groups of neurons in the deep neural network, and multiplying the accumulated sums to obtain a product; and make an inference using the deep neural network based on the product from the approximated datapath. A method for approximation in a deep neural network is also provided.

16 Claims, 8 Drawing Sheets

(51) Int. Cl.
  *G06N 3/08* (2023.01)
  *G06N 20/00* (2019.01)

(56) References Cited

U.S. PATENT DOCUMENTS

| | | | | |
|---|---|---|---|---|
| 11,443,553 | B1 * | 9/2022 | Liu | G06V 10/762 |
| 11,468,147 | B1 * | 10/2022 | Hofer | G06N 3/084 |
| 11,586,417 | B2 * | 2/2023 | Hill | G06F 7/5443 |
| 12,443,835 | B2 * | 10/2025 | Hunter | G06N 3/063 |
| 2018/0053086 | A1 * | 2/2018 | Liu | G06N 3/048 |
| 2018/0137417 | A1 * | 5/2018 | Theodorakopoulos | |
| | | | | G06N 3/082 |
| 2018/0314928 | A1 * | 11/2018 | Li | G06N 3/084 |
| 2019/0065192 | A1 * | 2/2019 | Tao | G06F 9/30149 |
| 2019/0187771 | A1 * | 6/2019 | Ambardekar | G06N 3/045 |
| 2019/0340499 | A1 * | 11/2019 | Burger | G06N 3/084 |
| 2021/0201003 | A1 * | 7/2021 | Banerjee | G06V 10/774 |
| 2022/0101091 | A1 * | 3/2022 | Srinivasa | G06F 7/523 |
| 2022/0108156 | A1 * | 4/2022 | Hunter | G06N 3/063 |
| 2022/0129759 | A1 * | 4/2022 | Yao | G06N 3/0464 |
| 2023/0017662 | A1 * | 1/2023 | Kadri | G06F 13/28 |
| 2024/0127069 | A1 * | 4/2024 | Najaf | G06N 3/084 |

FOREIGN PATENT DOCUMENTS

| | | | | |
|---|---|---|---|---|
| WO | WO2021101790 | A1 * | 5/2021 | |
| WO | WO 2021102679 | A1 * | 6/2021 | |
| WO | WO2022188135 | A1 * | 9/2022 | |

OTHER PUBLICATIONS

Junxue Zhang et al., "LiteFlow:towards high-performance adaptive neural networks for kernel datapath", SIGCOMM '22: Proceedings of the ACM SIGCOMM 2022 Conference pp. 414-427.*

Ramya Anasseriyil Viswambaran et al., "Evolving Deep Recurrent Neural Networks Using A New Variable-Length Genetic Algorithm", 2020 IEEE Congress on Evolutionary Computation (CEC) (2020, pp. 1-8).*

Sudip Paul et al., "Deep Learning and its Importance for Early Signature of Neuronal Disorders", 2018 4th International Conference on Computing Communication and Automation (ICCCA) (2018, pp. 1-5).*

Qingchen Zhang et al., "A Tensor-Train Deep Computation Model for Industry Informatics Big Data Feature Learning", IEEE Transactions on Industrial Informatics (vol. 14, Issue: 7, 2018, pp. 3197-3204).*

Gao, H. et al., "ChannelNets: Compact and Efficient Convolutional Neural Networks via channel-Wise Convolutions," 32nd Conference on Neural Information Processing Systems (NeurIPS 2018), Montreal, Canada (9 pages).

Burkov, E. et al., "Deep Neural Networks with Box Convolutions," 32nd Conference on Neural Information Processing Systems (NeurIPS 2018), Montreal, Canada (11 pages).

Desai, S., "Lecture: Deep Convolutional Neural Networks," Dec. 2018 (32 pages).

Disclosed Anonymously, "Branching Neural Networks," IPCOM000254791D (Aug. 2018) (11 pages).

Disclosed Anonymously, "Design of Neural Networks Based on Cost Estimation," IPCOM000257359D (Feb. 2019) (11 pages).

Disclosed Anonymously, "Determining Priority Value of Processes Based on Usage History," IPCOM000252344D (Jan. 2018) (39 pages).

Mell et al., "The NIST Definition of Cloud Computing," NIST Special Publication 800-145, Sep. 2011 (7 pages).

Choi et al., "Accurate and Efficient 2-Bit Quantized Neural Networks," Proceedings of the 2nd SysML Conference, Palo Alto, CA, USA, 2019 (12 pages).

Yang et al., "DeepHoyer: Learning Sparser Neural Network with Differentiable Scale-Invariant Sparsity Measures," arXiv:1908.09979v2 (Jan. 2020) (18 pages).

Hua et al., "Channel Gating Neural Networks," arXiv:1805.12549v2 (Oct. 2019) (11 pages).

* cited by examiner

400

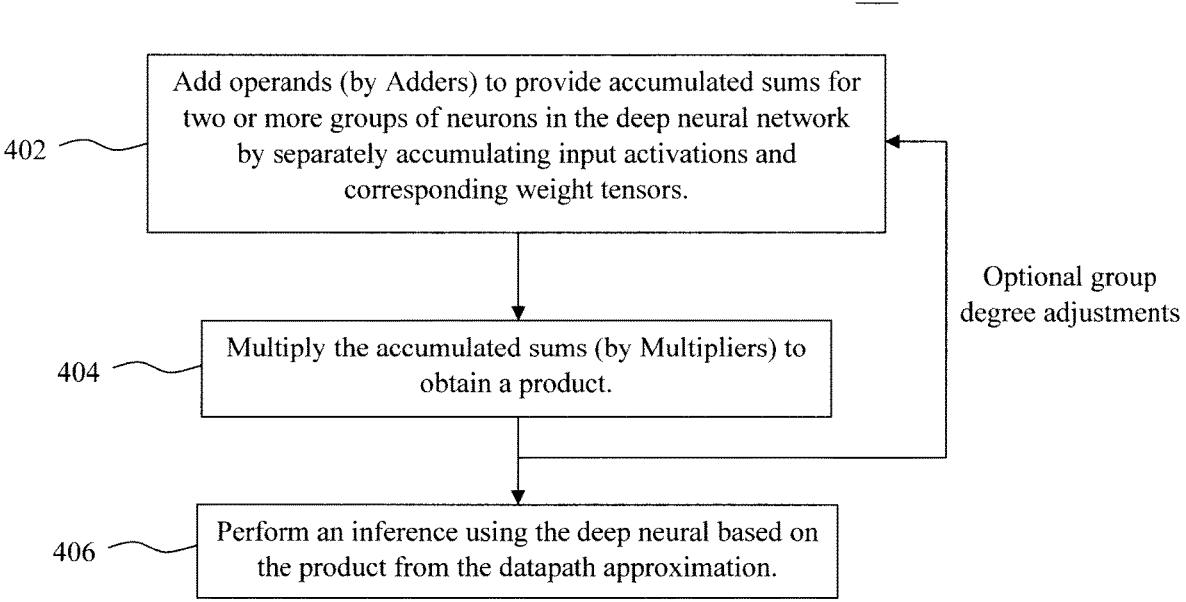

402 — Add operands (by Adders) to provide accumulated sums for two or more groups of neurons in the deep neural network by separately accumulating input activations and corresponding weight tensors.

Optional group degree adjustments

404 — Multiply the accumulated sums (by Multipliers) to obtain a product.

406 — Perform an inference using the deep neural based on the product from the datapath approximation.

FIG. 4

Mul: 2 (5*5 MUL)

Adds: 2 (4*4 ADD), 1 (10*10 ADD), 1 (32*11 ADD)

100

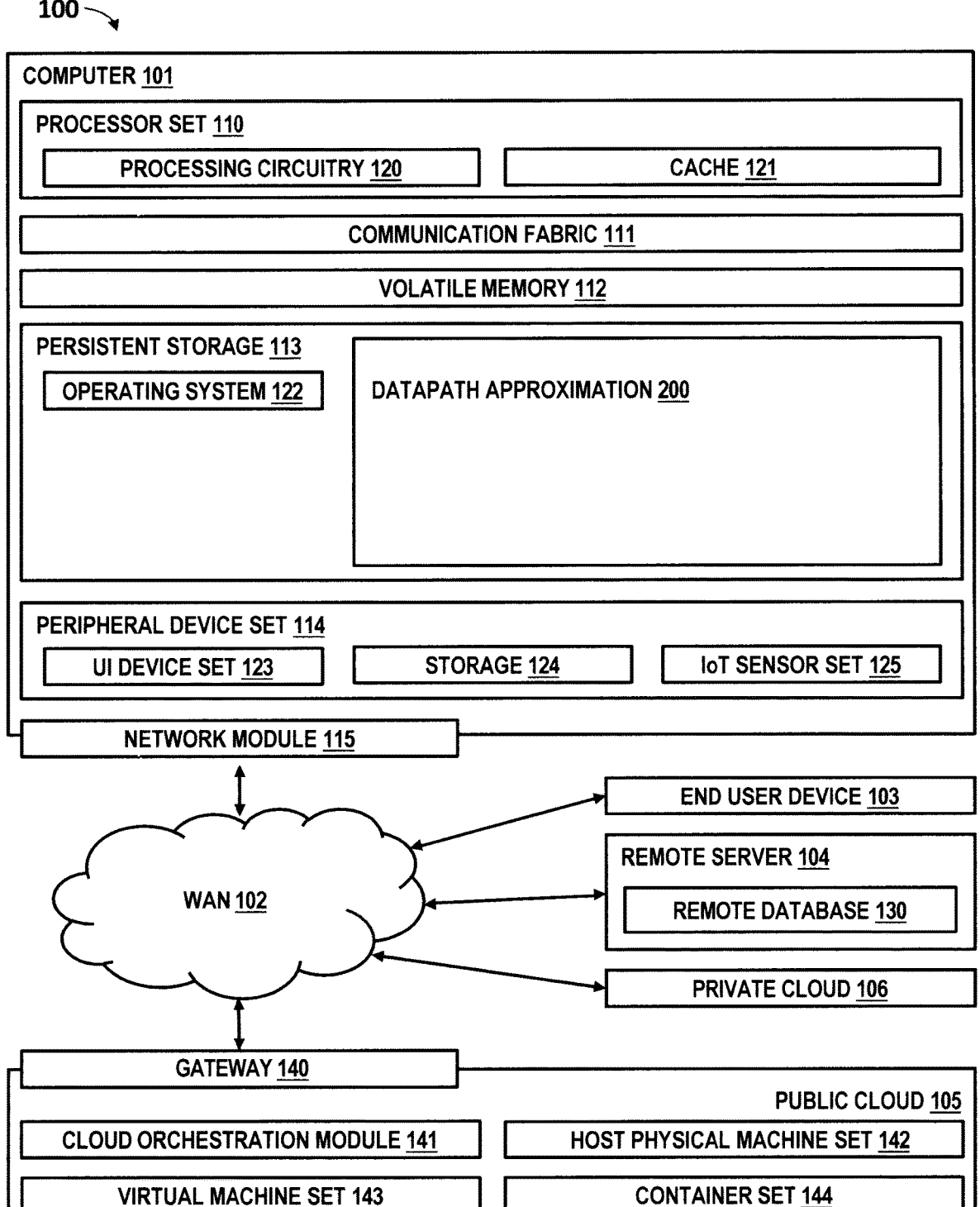

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122    DATAPATH APPROXIMATION 200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 8

FUSED CONVOLUTIONS FOR FAST DEEP NEURAL NETWORK

FIELD OF THE INVENTION

The present invention relates to deep neural networks for machine learning applications, and more particularly, to use of fused channel and/or fused filter convolutions for speeding up deep neural network execution.

BACKGROUND OF THE INVENTION

The widespread success of deep neural networks in various machine learning applications such as image recognition, speech recognition, and natural language processing, has led to their deployment in several real-world products and services. However, state-of-the-art deep neural networks place immense computational and memory demands on the underlying computing platforms on which they execute.

Consequently, a wide range of algorithmic, software and hardware-based techniques have been proposed to improve the execution efficiency of deep neural network inference. One approach includes model size reduction techniques, such as pruning and model quantization.

Pruning exploits the error-tolerant nature of deep neural networks by identifying model parameters that can be removed from the network without affecting classification accuracy. Naturally, this translates to faster execution times due to the reduced number of multiply and accumulate operations. Similarly, quantization strategies identify low-precision bit-widths (e.g., 4-bit integer) for representing model weights and activations, often rivalling the accuracy of 32-bit floating point models while achieving orders of magnitude better energy efficiency. These traditional approximation approaches, however, make computations more irregular.

SUMMARY OF THE INVENTION

The present invention provides fused channel and/or fused filter convolutions for fast deep neural network execution. In one aspect of the invention, a system is provided. The system includes: a processor, connected to a memory, configured to: implement an approximated datapath in a deep neural network having a sequence of adders and multipliers for adding up operands to provide accumulated sums for two or more groups of neurons in the deep neural network, and multiplying the accumulated sums to obtain a product; and make an inference using the deep neural network based on the product from the approximated datapath.

The operands can include input activations for the two or more groups of neurons in the deep neural network and corresponding weight tensors. For instance, adding up the operands can include: accumulating the input activations for each of the two or more groups of neurons in the deep neural network; and accumulating the corresponding weight tensors for each of the two or more groups of neurons in the deep neural network. Advantageously, the inference is performed on the reduced-size input activations and corresponding weight tensors, resulting in direct runtime benefits.

Further, different dimensions of the input activations are considered herein. For instance, input activations can be mapped to different input channels, different filters, or a combination thereof. Mapping the input activations to different input channels fuses the input channels. Likewise, mapping the input activations to different filters fuses the pixels/filters advantageously reducing the size of the input operands.

In another aspect of the invention, a method for approximation in a deep neural network is provided. The method includes: approximating a datapath of the deep neural network through a sequence of adders and multipliers by adding up operands to provide accumulated sums for two or more groups of neurons in the deep neural network, and multiplying the accumulated sums to obtain a product; and making an inference using the deep neural network based on the product from the approximating of the datapath. The input activations can be accumulated dynamically while making the inference.

A more complete understanding of the present invention, as well as further features and advantages of the present invention, will be obtained by reference to the following detailed description and drawings.

BRIEF DESCRIPTION OF THE DRAWINGS

FIG. 4 is a diagram illustrating an exemplary methodology for datapath approximation according to an embodiment of the present invention;

FIG. 8 is a diagram illustrating an exemplary computing environment according to an embodiment of the present invention.

DETAILED DESCRIPTION OF PREFERRED EMBODIMENTS

Provided herein are techniques for speeding up deep neural network execution on mainstream computing platforms using fused channel convolutions, without any specialized hardware design. With the present approach, instead of operating on all neuron activations across the network, groups of neighboring neuron input activations and their corresponding weight tensors are accumulated (add the values). As will be described in detail below, the accumulating of these input activations is conducted dynamically during inference, while the weight tensors are transformed statically. The final convolution is then performed on the reduced-size activation and weight tensors, advantageously resulting in direct runtime benefits. Notably, with appropriate identification of the degree of grouping across layers, the present techniques do not affect deep neural network accuracy. By 'transformed statically' it is meant that the weight tensors of a deep neural network are computed during the training phase and are not modified during inference. In the present context, their accumulation also need not be done during inference time, but rather can be precomputed during training time itself. This allows the same accumulated weight to be shared across inferences on multiple inputs and does not have to be computed when inferencing on each input, thereby saving more computations.

Figure 1:
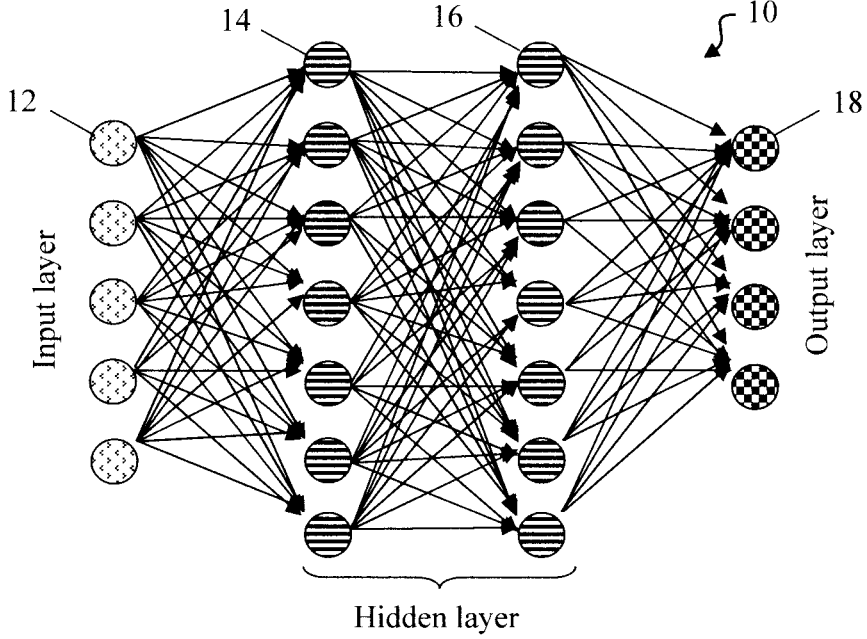
FIG. 1 is a schematic diagram illustrating an exemplary deep neural network according to an embodiment of the present invention.

An exemplary deep neural network 10 is shown in FIG. 1. As shown in FIG. 1, deep neural network 10 includes a plurality of interconnected processor elements 12, 14/16 and 18 that form an input layer, at least one hidden layer, and an output layer, respectively, of the deep neural network 10. In machine learning and cognitive science, neural networks are a family of statistical learning models inspired by the biological neural networks of animals, and in particular the brain. Neural networks may be used to estimate or approximate systems and cognitive functions that depend on a large number of inputs and weights of the connections which are generally unknown. Neural networks are often embodied as so-called "neuromorphic" systems of interconnected processor elements which act as simulated "neurons" that exchange "messages" between each other in the form of electronic signals.

Convolutional neural networks are a class of deep neural networks that are often used in visual imagery analysis for tasks such as image classification. Convolutional layers are the main building blocks of a convolutional neural network. Each convolutional layer processes input (e.g., input images) through a set of filters (or kernels) which applies a convolution operation to the input images, producing a feature map for each of the filters that maps the relevant features preserved by the filters. The results are then passed to the next layer in the convolutional neural network, and so on. Pooling is used to merge the data from the feature maps at each of the convolutional layers, and flattening is used to convert this data into a one-dimensional array that is then provided to a final fully-connected layer of the network which makes classification decisions.

Deep neural networks such as convolutional neural networks are trained on labeled sets of training data. Once trained, the deep neural network can be used for inference. Inference applies knowledge from a trained deep neural network model and uses it to infer a result. As provided above, with the present techniques the accumulating of the input activations is conducted dynamically during inference, while the weight tensors are transformed statically.

Figure 2:
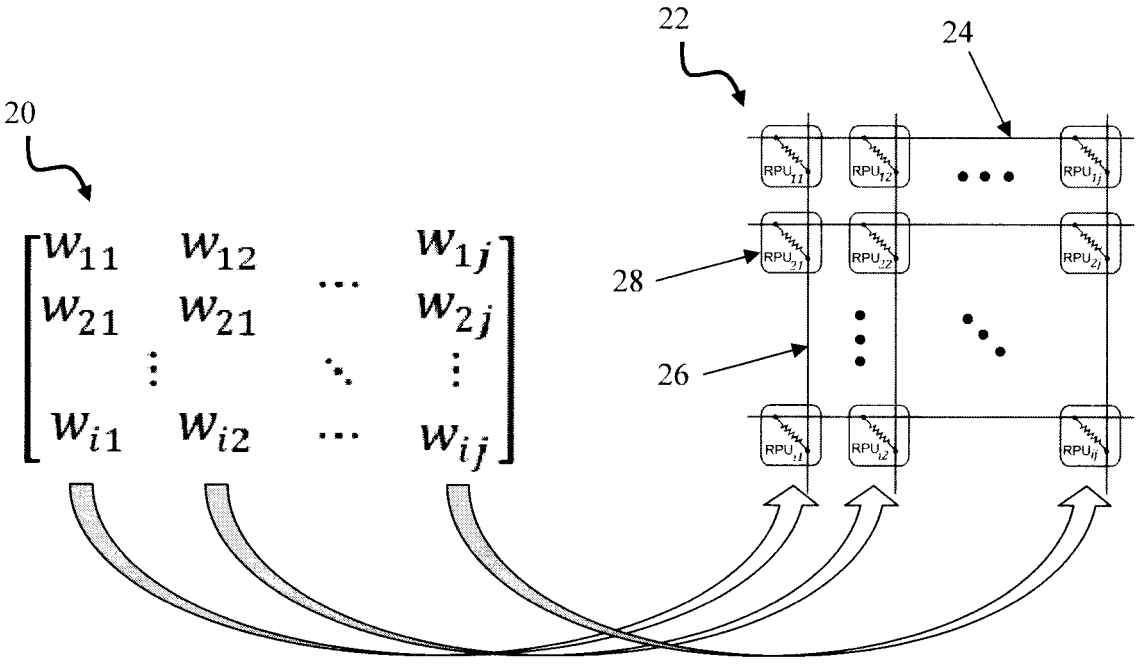
FIG. 2 is a diagram illustrating an exemplary analog cross-point array of resistive processing unit devices according to an embodiment of the present invention.

Hardware accelerators for deep neural networks, such as those used in accordance with the present techniques, can employ compute engines such as analog crossbars designed using non-volatile memories (such as resistive processing unit (RPU) devices) that perform multiply and accumulate operations on incoming data. See, for example, FIG. 2. As shown in FIG. 2, each parameter (weight $w_{ij}$) of an algorithmic weight matrix 20 is mapped to a single RPU device (RPU$_{ij}$) on hardware, namely a physical cross-point array 22 of RPU devices. The cross-point array 22 has a series of conductive row wires 24 and a series of conductive column wires 26 oriented orthogonal to, and intersecting, the conductive row wires 24. The intersections of the conductive row wires 24 and column wires 26 are separated by RPU devices 28 forming the cross-point array 22 of the RPU devices 28. By way of example only, each RPU device 28 can include a first terminal, a second terminal and an active region. A conduction state of the active region identifies a weight value of the RPU device 28, which can be updated/adjusted by application of a signal to the first/second terminals. Further, three-terminal (or even more terminal) devices can serve effectively as two-terminal resistive memory devices by controlling the extra terminals.

Each RPU device 28 (RPU$_{ij}$) is uniquely identified based on its location in (i.e., the i$^{th}$ row and j$^{th}$ column) of the cross-point array 22. For instance, going from the top to bottom, and from the left to right of cross-point array 22, the RPU device 28 at the intersection of the first conductive row wire 24 and the first conductive column wire 26 is designated as RPU$_{11}$, the RPU device 28 at the intersection of the first conductive row wire 24 and the second conductive column wire 26 is designated as RPU$_{12}$, and so on. The mapping of the weight parameters in weight matrix 20 to the RPU devices 28 in cross-point array 22 follows the same convention. For instance, weight $w_{i1}$ of weight matrix 20 is mapped to RPU$_{i1}$ of the cross-point array 22, weight $w_{i2}$ of weight matrix 20 is mapped to RPU$_{i2}$ of the cross-point array 22, and so on.

The RPU devices 28 of the cross-point array 22 function as the weighted connections between neurons in the deep neural network. The resistance of the RPU devices 28 can be altered by controlling the voltages applied between the individual conductive row and column wires 24 and 26. Altering the resistance is how data is stored in the RPU devices 28 based, for example, on a high resistance state or a low resistance state. The resistance state of the RPU devices 28 is read by applying a voltage and measuring the current that passes through the target RPU device 28. All of the operations involving weights are performed fully in parallel by the RPU devices 28.

Typically, each of the multiply and accumulate operations performed by the hardware accelerator involves computing the product of an operand using a multiplier in the compute engine. The term "operand" as used herein refers generally to the data on which a mathematical operation (e.g., multiplication, addition, etc.) is being done. An adder of the compute engine then adds that product to an accumulator, e.g., a register for storing the results. Typical hardware accelerators have a datapath that includes a sequence of these multipliers and adders feeding to the accumulators. The above-described traditional approximation approaches like pruning and model quantization affect the inputs to this datapath by reducing the bit-width of the operand or eliminating some inputs. To look at it another way, these approaches approximate the input data to the datapath.

By contrast, the present techniques make approximations within the datapath of the deep neural network through a sequence of adders and multipliers. For instance, according to an exemplary embodiment, the present 'datapath approximations' involve swapping the multiplier and adder positions within the datapath. The notion here is that a multiplier is quadratic in complexity, whereas an adder is linear. Namely, when 2 N-bit numbers are added, the number of operations needed is O(N), i.e., each bit is added together with the carry from the previous bit. However, when 2 N-bit numbers are multiplied, the product between each pair of bits (which is quadratic O(N²)) is found first, before aligning and adding the partial results to produce the final result. As highlighted above, typical hardware accelerators have a datapath that includes a sequence of multipliers and adders feeding to the accumulators where, for n operands, there are n multipliers heading the datapath. See, e.g., FIG. 2 below. However, by swapping the positions of the multipliers and adders in the datapath, one can logarithmically reduce the number of multipliers in the datapath, thereby greatly reducing the overall computation energy. The terms "multiplier," "adder," etc. as used herein refer to the solvers (i.e., mathematical software) implemented by the hardware accelerator to perform the respective mathematical operations, i.e., multiplication, addition, etc.

Figure 3:
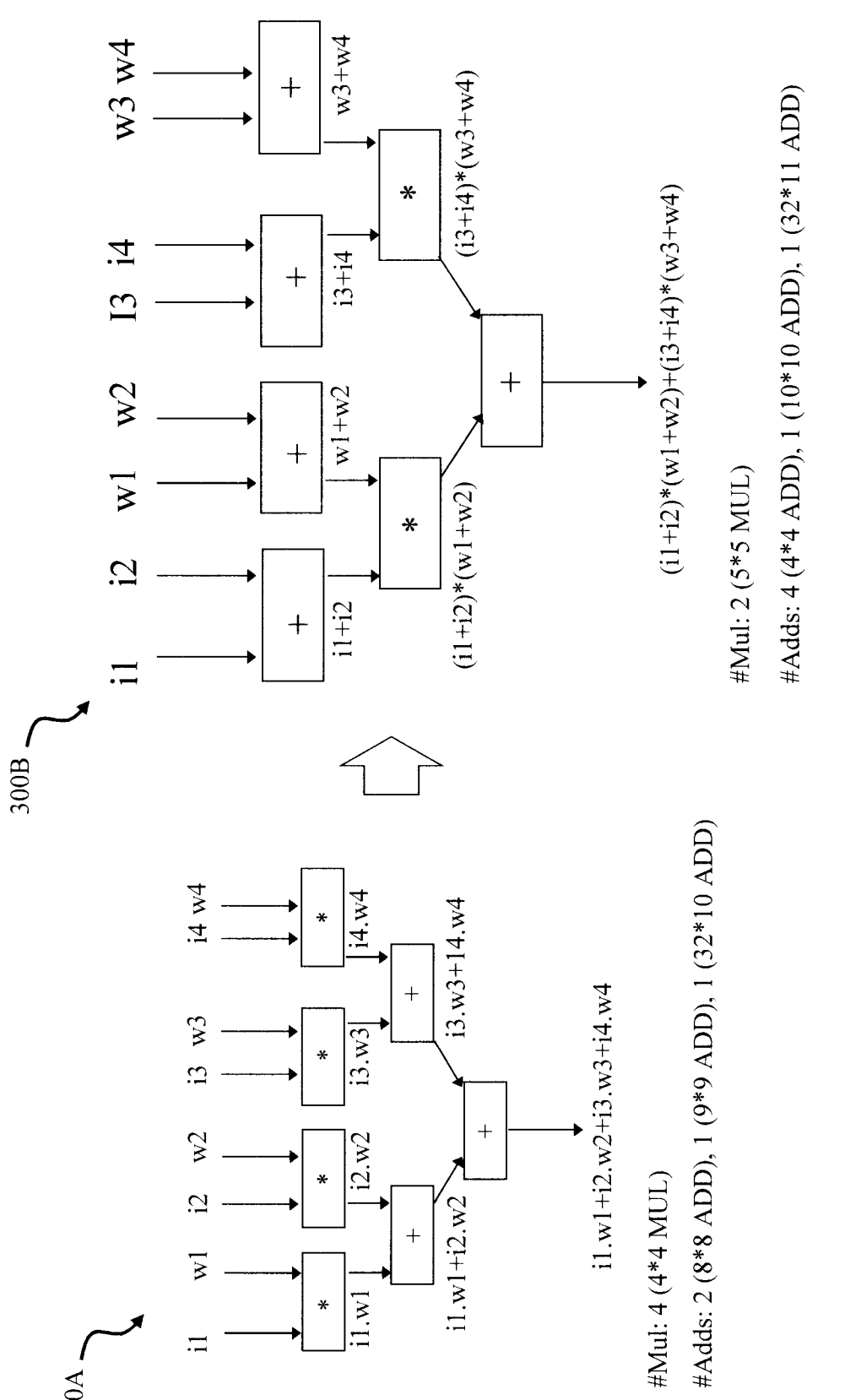
FIG. 3 is a diagram illustrating an exemplary approximated datapath according to an embodiment of the present invention.

More specifically, reference is now made to the datapaths 300A (having n multipliers for n operands) and 300B (with multiplier and adder positions swapped) shown in FIG. 3 and methodology 400 for datapath approximation shown in FIG. 4. In FIG. 3, multipliers are represented by the symbol (*) and adders by the symbol (+). Each of the datapaths 300A and 300B involves performing mathematical operations on multiple neural network input activations, e.g., i1, i2, i3, and i4 and multiple corresponding weight tensors, e.g., w1, w2, w3 and w4. In this particular example, datapath 300A employs four multipliers (Mul) at the outset to compute the products i1·w1, i2·w2, i3·w3 and i4·w4, respectively. Adders (Adds) downstream from the multipliers are then used to accumulate the values, i.e., i1·w1+i2·w2 and i3·w3+i4·w4, and ultimately arrive at the product i1·w1+i2·w2+i3·w3+i4·w4. As shown below the datapath 300A, each of the multipliers produces an 8-bit result. Thus, in the first stage, there are two adders which add 8-bit inputs to produce 9-bit results. The two 9-bit results are added using one 9-bit adder to produce a 10-bit result. Finally, this 10-bit result is added to the results from a previous iteration of this data-path (this is the final sum accumulated over several input activations and weights and hence is typically of a higher precision 32 bits or 24 bits). Thus, there is an additional 32*10 ADD which, although not shown in FIG. 3, would be apparent to one skilled in the art.

In contrast, however, an approximation can be made in the datapath by swapping the positions of the multipliers (Mul) and adders (Adds) in order to realize a reduction in the number of multipliers (which are quadratic in complexity) and thus a significant computational savings. See datapath 300B. To do so, the input activation functions i1, i2, i3, and i4 for the neurons in the deep neural network and their corresponding weight tensors w1, w2, w3 and w4 are first accumulated. See, for example, step 402 of methodology 400. As shown in datapath 300B of FIG. 3, this involves use of the adders to first add up the operands, i.e., i1+i2, w1+w2, i3+i4 and w3+w4. Generally, the input activation functions (or simply 'input activations') decide whether a given neuron in the deep neural network (for example, as provided above, the RPU devices of the cross-point array can function as the weighted connections between neurons in the deep neural network) should be activated or not during the inference process. To look at it another way, the activation function for a given neuron determines the importance that given neuron has on the inference task at hand, e.g., classification prediction.

According to an exemplary embodiment, the operands (i.e., input activations and weight tensors) accumulated in step 402 of methodology 400 correspond to groups of neighboring neurons in the deep neural network. Specifically, in a deep neural network, each neuron gets its input from the output produced by other neurons. In this context, neighboring neurons are the neurons whose outputs are fed as adjacent inputs to another neuron. Thus, for instance, in the example depicted in approximated datapath 300B of FIG. 3, the input activations i1 and i2, and the weight tensors w1 and w2 correspond to one (first) group of neighboring neurons in the deep neural network, the input activations i3 and i4, and the weight tensors w3 and w4 correspond to another (second) group of neighboring neurons in the deep neural network, and so on. Thus, the result is (two or more) accumulated sums corresponding to the (two or more) groups of neighboring neurons. Further, in this exemplary embodiment, adding up the operands in step 402 of methodology 400 involves accumulating the input activations for each of the group of neighboring neurons, and separately accumulating their corresponding weight tensors. This example is shown depicted in approximated datapath 300B of FIG. 3 where i1+i2, w1+w2, i3+i4 and w3+w4 are separately computed. However, as will be described in detail below, the group degree can be expanded (from what is shown in approximated datapath 300B of FIG. 3) to include additional neurons (input activations) and weight tensors in each of the groups in order to achieve a greater computational savings.

It is notable that in the approximated datapath 300B, the adders are thus in the position of the multipliers in datapath 300A. Doing so means that the multipliers in the approximated datapath 300B are in the position of the adders in datapath 300A. Namely, the positions of the multipliers and the adders have been swapped. Accordingly, moving the multipliers (in this case one level down) in the datapath advantageously reduces the number of multipliers from four in datapath 300A to two in datapath 300B. It is notable that, while this multiplier/adder swap increases the number of adders, the size of the adders is proportionally reduced.

In the approximated datapath 300B, the multipliers then multiply the accumulated sums, i.e., (i1+i2)*(w1+w2) and (i3+i4)*(w3+w4) to ultimately form the product (i1+i2)*(w1+w2)+(i3+i4)*(w3+w4). See, for example, step 404 of methodology 400. Since the addition is performed before the multiplication, the adder size is reduced to only 4 bits. Namely, as shown below the datapath 300B, each of the adders produces a 5-bit result. Thus, in the first stage, there are two multipliers which multiply 5-bit inputs to produce 10-bit results. The two 10-bit results are added using one 10-bit adder to produce an 11-bit result. Finally, this 11-bit result is added to the results from a previous iteration of this data-path (this is the final sum accumulated over several input activations and weights and hence is typically of a higher precision 32 bits or 24 bits). Thus, there is an additional 32*11 ADD which, although not shown in FIG. 3, would be apparent to one skilled in the art.

As highlighted above, the groupings of neighboring neurons shown in the approximated datapath 300B of FIG. 3 are merely an example provided to illustrate the present techniques. The present techniques are more generally applicable to any scenario where the accumulated sums from two or more groups of neighboring neurons are provided to the multipliers. Namely, according to an exemplary embodiment, the group degree (basically the number of neurons and corresponding weight tensors included in each group of neighboring neurons) is extended from what is shown in the approximated datapath 300B of FIG. 3 to include additional input activations and corresponding weight tensors to realize an even greater computational savings.

In step 406 of methodology 400, an inference is performed using the deep neural network based on the output (datapath approximation) product from step 404. For instance, according to an exemplary embodiment, the output product that has been computed is then fed to a normalization function (such as fused batch norm) and an activation function (such as ReLU, Tanh, etc.). These are simple element-wise operations. After this, the output is fed as input to the neurons in the next layer of the deep neural network (which is then again approximated). This process is repeated until the final layer of the deep neural network is reached, which produces the final inference result. As described above, the accumulation of the input activations is performed dynamically during the inference. Further, as described in detail above, the group degree can be changed, e.g., extended to include additional input activations and corresponding weight tensors. Thus, as shown in FIG. 4, group degree adjustments can also be made to get different benefits. For instance, different group degrees can be applied to different convolutional layers of the deep neural network. By way of example only, this can involve applying a group degree of four to initial layers and a group degree of two to later layers. As an example, the approximated datapath 300B of FIG. 3 uses a group degree of two, i.e., i1+i2 and i3+i4. Following that convention, a group degree of four would be i1+i2+i3+i4. The group degree can be adjusted to obtain a near-iso degree of deep neural network accuracy as compared to datapaths without approximation. For instance, during testing, an accuracy of 93.76% was achieved for an approximated datapath in accordance with the present techniques with a group degree of two, and an accuracy of 93.8% was achieved for an approximated datapath in accordance with the present techniques with a group degree of four, as compared to a baseline (no approximation) accuracy of 93.9%.

Thus far, focus has been on approximations at the hardware level. However, consideration is now given as to the dimension the input activations, e.g., i1, i2, i3, and i4, correspond to. The notion here is that the impact of the approximation from a workload perspective can also depend on which dimension is mapped on the input operands of the data path. The term 'impact' refers to the functional impact on the output produced. Because the computations within the datapath are being approximated, the output (while not numerically exact) is sufficiently precise from an end-application/workload perspective. Thus, the different options could have differing impacts on the output accuracy. For instance, embodiments are considered herein where the channel dimension, or the filter kernel dimension is mapped on the input operands of the data path. See, for example, FIG. 5. As provided above, convolutional layers are the main building blocks of a neural network, where each convolutional layer processes input through a set of filter kernels which applies a convolution operation to the input. The results are then passed to the next layer in the convolutional neural network, and so on. Typically, the inputs to the convolutional layers are called input channels, and the outputs from the convolutional layers are called output channels. Thus, referring to FIG. 5, each convolutional layer of the deep neural network consumes an incoming intermediate image with C number of channels, each channel containing Ii by Ij pixels. An outgoing intermediate image is produced by convolving a set of filter kernels K, each filter kernel K containing, e.g., C by Ki by Kj pixels, across the incoming intermediate image.

Thus, according to an exemplary embodiment, the input activations correspond to the input channel dimension. To do so, different input channels (of the convolutional layers) are mapped to the input activations, e.g., i1, i2, i3, and i4. These channel dimension input activations are then used for datapath approximation as described in conjunction with the description of methodology 400 of FIG. 4 above which, in this case, involves 'fusing' the input channels. To look at it another way, the present datapath approximation technique with different input channels mapped to the input activations serves to approximate two channels into one, thereby 'fusing' the channels. Thus, this channel dimension-based option is also referred to herein as a 'fused channel convolution' approach.

Figure 5:
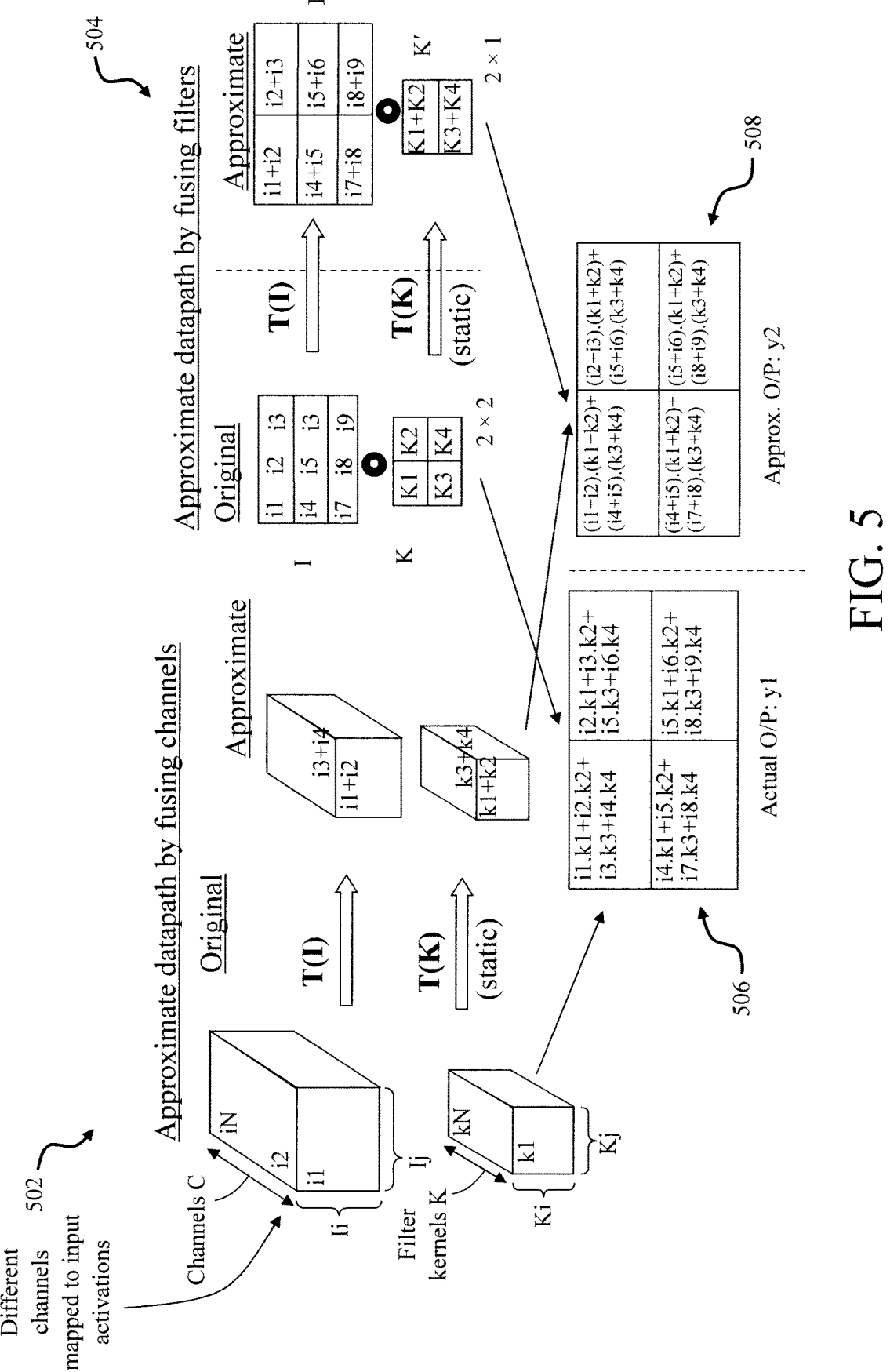
FIG. 5 is a diagram illustrating a channel dimension or a filter kernel dimension having been mapped on the input operands of the datapath according to an embodiment of the present invention.

For instance, example 502 of FIG. 5 shows that input activations i1, i2, i3, and i4 are each mapped to different channels C. Thus, by accumulating the input activations, the corresponding channels are fused, e.g., the channels mapped to input activations i1 and i2 are approximated into one channel i1+i2, the channels mapped to input activations i3 and i4 are approximated into another channel i3+i4, and so on. Thus, a savings is achieved based on the reduced-size input operands. The accumulation of the filter kernels k1, k2, k3, k4, etc. are also shown in example 502, i.e., k1+k2, k3+k4, etc. In the context of convolutional neural networks, weights are also referred to as kernels. The concept, however, remains the same. Thus, in that regard, the terms 'weights (w)' and 'kernels (k)' are used interchangeably herein. As highlighted above, this transformation T(I) (by accumulation) of the input activations i1, i2, i3, and i4 is conducted dynamically during inference, while the transformation T(K) (by accumulation) of the filter kernels K is static. Boxes 506 and 508 depict standard multiply and accumulate operations versus what is obtained using the present fused channel approximations, respectively, e.g., $i1 \cdot K1 + i2 \cdot K2 + i3 \cdot K3 + i4 + K4$ versus $(i1+i2) \cdot (K1+K2) + (i4+i5) \cdot (K3+K4)$, etc. The designation 'Actual O/P' refers to the actual output (without approximations), and the designation 'Approx. O/P' refers to the approximate output (based on the present approximation approach).

Alternatively, according to another exemplary embodiment, the input activations correspond to the filter dimension. The notion here is that each convolution has a filter, and the input activations i1 and i2 are thought of as adjacent pixels operated on by different filters. Thus, instead of fusing different channels (as in the previous example), this example involves fusing adjacent pixels/filters. To do so, different filters are mapped to the input activations, e.g., i2, i3, and i4. These filter dimension input activations are then used for datapath approximation as described in conjunction with the description of methodology 400 of FIG. 4 above which, in this case, involves 'fusing' the filters. Thus, this filter dimension-based option is also referred to herein as a 'fused filter convolution' approach.

For instance, example 504 of FIG. 5 shows that input activations i1, i2, i3, and i4 are each mapped to different filter kernels K. Therefore, by accumulating the input activations, the corresponding pixels/filters K are fused, e.g., K1+K2 fuses K1 and K2, K3+K4 fuses K3 and K4, and so on. As a result, in the present example the pixels/filters are fused into a 2×1 dimension (from a 2×2 dimension), thereby realizing a savings based on the reduced-size input operands. The transformation T(I) (by accumulation) of the input activations i1, i2, i3, and i4 is conducted dynamically during inference, while the transformation T(K) (by accumulation) of the filter kernels K is static. As described above, boxes 506 and 508 depict standard multiply and accumulate operations versus what is obtained using the present fused channel approximations, respectively, e.g., $i1 \cdot K1 + i2 \cdot K2 + i3 \cdot K3 + i4 + K4$ versus $(i1+i2) \cdot (K1+K2) + (i4+i5) \cdot (K3+K4)$, etc. As provided above, the designation 'Actual O/P' refers to the actual output (without approximations), and the designation 'Approx. O/P' refers to the approximate output (based on the present approximation approach).

Figure 6:
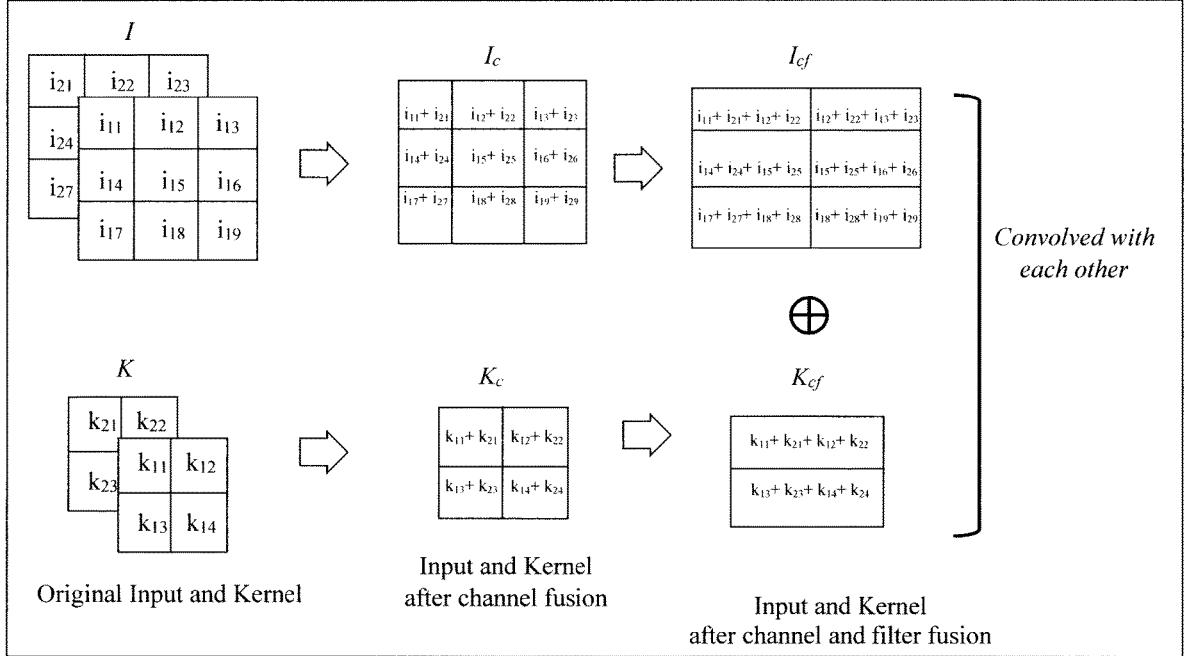
FIG. 6 is a diagram illustrating a hybrid approach where both the channel and filter dimensions are combined according to an embodiment of the present invention.

In yet a further exemplary embodiment, a hybrid approach is implemented where both the channel and filter dimensions are combined. See, for example, FIG. 6. FIG. 6 is a diagram illustrating a hybrid approach where 4 activation pixels (i11+i21+i12+i22) and 4 kernel values (k11+k21+k12+k22) are accumulated (or) fused before being multiplied. The 4 values accumulated vary along both the channel and filter dimensions. k11 corresponds to the first channel and filter position (0,0), and k21 corresponds to the same filter position (0,0) but the neighboring channel. On the other hand, k12 corresponds again to the first channel but filter position (0,1), and finally k22 corresponds to the second channel and filter position (0,1). Thus, the hybrid option allows accumulation of values from multiple dimensions providing more flexibility to the approximation.

Figure 7:
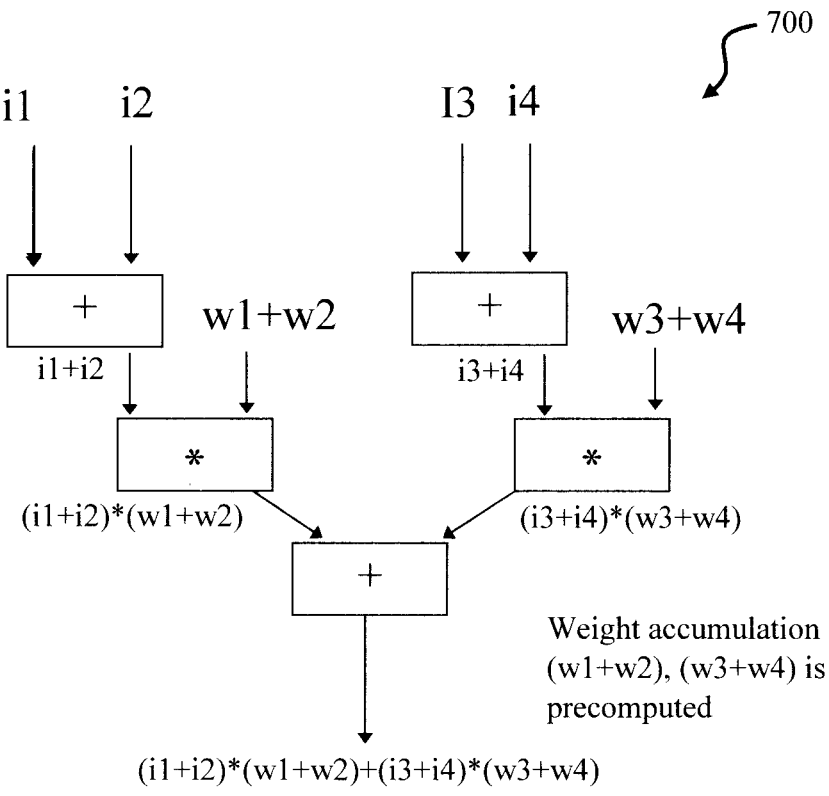
FIG. 7 is a diagram illustrating an exemplary approximated datapath with precomputed weights according to an embodiment of the present invention.

As provided above, the accumulation of the weight tensors does not need to be done during inference time, but rather can be precomputed during training. This allows the same accumulated weight to be shared across inferences on multiple inputs, rather than computing the accumulated weight when inferencing on each input, which advantageously provides for a greater computational savings. See, for example, approximated datapath 700 in FIG. 7. By comparison with approximated datapath 300B in FIG. 3 (described above), the weight accumulation (w1+w2), (w3+ w4) is precomputed (during training) in approximated datapath 700.

As will be described below, the present techniques can optionally be provided as a service in a cloud environment. For instance, by way of example only, one or more steps of methodology 400 of FIG. 4 can be performed on a dedicated cloud server.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 8, computing environment 100 contains an example of an environment for the execution of at least some of the computer code involved in performing the inventive methods, such as datapath approximation code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 8. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A system comprising:
a processor;
a computer readable storage media; and program instructions stored on the computer readable storage media for execution by the processor to perform operations comprising:
inputting an input into a deep neural network wherein the deep neural network comprises an intermediate processing element that receives multiple intermediate inputs, respectively, from multiple upstream processing elements disposed in the deep neural network upstream from the intermediate processing element within the deep neural network, wherein the multiple intermediate inputs are based on the input into the deep neural network, and wherein the intermediate processing element processes the multiple intermediate inputs through a sequence comprising:
firstly, adding up a first group of input activations from two or more of the multiple intermediate inputs to provide a first accumulated sum,
adding up a second group of weight tensors for the two or more of the multiple intermediate inputs to provide a second accumulated sum, wherein the weight tensors correspond to the input activations,
subsequently, multiplying the first accumulated sum against the second accumulated sum to obtain a product; and
forwarding an intermediate processing element output to one or more downstream processing elements of the deep neural network, wherein the intermediate processing element output is based on the product; and
receiving, from an output layer of the deep neural network, an inference for the input, wherein the deep neural network determines the inference based on the intermediate processing element output.

2. A method comprising:
inputting an input into a deep neural network, wherein the deep neural network comprises an intermediate processing element that receives multiple intermediate inputs, respectively, from multiple upstream processing elements disposed in the deep neural network upstream from the intermediate processing element within the deep neural network, wherein the multiple intermediate inputs are based on the input into the deep neural network, and wherein the intermediate processing element processes the multiple intermediate inputs through a sequence comprising:
firstly adding up a first group of input activations from two or more of the multiple intermediate inputs to provide a first accumulated sum, adding up a second group of weight tensors for the two or more of the multiple intermediate inputs to provide a second accumulated sum, wherein the weight tensors correspond to the input activations,
subsequently, multiplying the first accumulated sum against the second accumulated sum to obtain a product, and
forwarding an intermediate processing element output to one or more downstream processing elements of the deep neural network, wherein the intermediate processing element output is based on the product; and
receiving, from an output layer of the deep neural network, an inference for the input, wherein the deep neural network determines the inference based on the intermediate processing element output.

3. The method of claim 2, wherein:

the adding up of the first group of input activations comprises adding up more than two input activations to produce the first accumulated sum, and the adding up of the second group of weight tensors comprises adding up more than two corresponding weight tensors that correspond, respectively, to the more than two input activations to produce the second accumulated sum.

4. The method of claim 3, wherein the weight tensors are applied statically during the inference and are determined during a training stage of the deep neural network.

5. The method of claim 2, further comprising:

mapping different input channels, different filters, or a combination thereof to the input activations so that the different input channels, the different filters, or the combination thereof are fused.

6. The method of claim 2, wherein the intermediate processing element, the multiple upstream processing elements, and the one or more downstream processing elements are respective neurons of the deep neural network.

7. The method of claim 2, wherein the intermediate processing element, the multiple upstream processing elements, and the one or more downstream processing elements are respective analog crossbars of the deep neural network, and the deep neural network is a hardware accelerator.

8. The method of claim 2, wherein the intermediate processing element, the multiple upstream processing elements, and the one or more downstream processing elements are respective resistive processing units whose resistance is adjusted according to voltage applied.

9. The method of claim 2, wherein the product is input into at least one of a normalization function and an activation function whose functional output constitutes the intermediate processing element output.

10. The method of claim 2, wherein the intermediate processing element is within a first intermediate layer of the deep neural network and the one or more downstream processing elements are in a downstream layer of the deep neural network, the downstream layer being disposed downstream from the intermediate layer within the deep neural network.

11. The method of claim 2, wherein:

the first group of input activations comprises filter dimension input activations for the two or more multiple upstream processing elements in the deep neural network, the second group of weight tensors comprises corresponding filter kernels, respectively, to the input activations, and the multiple upstream processing elements are adjacent filters that the sequence fuses together.

12. The method of claim 2, wherein the input is an image and the sequence fuses adjacent pixels of an intermediate image produced within the deep neural network.

13. The method of claim 2, wherein:

the first group of input activations comprises activation pixels, the second group of weight tensors comprises filter kernels, and the filter kernels vary along both channel and filter dimensions.

14. A computer program product comprising:

a computer readable storage medium; and program instructions stored on the computer readable storage medium for performing operations comprising:

inputting an input into a deep neural network, wherein the deep neural network comprises an intermediate processing element that receives multiple intermediate inputs, respectively, from multiple upstream processing elements disposed in the deep neural network upstream from the intermediate processing element within the deep neural network, wherein the multiple intermediate inputs are based on the input into the deep neural network, and wherein the intermediate processing element processes the multiple intermediate inputs through a sequence comprising:

firstly, adding up a first group of input activations from two or more of the multiple intermediate inputs to provide a first accumulated sum, adding up a second group of weight tensors for the two or more of the multiple intermediate inputs to provide a respective second accumulated sum, wherein the weight tensors correspond to the input activations, multiplying the first accumulated sum against the second accumulated sum to obtain a product, and forwarding an intermediate processing element output to one or more downstream processing elements of the deep neural network, wherein the intermediate processing element output is based on the product; and receiving, from an output layer of the deep neural network, an inference for the input, wherein the deep neural network determines the inference based on the intermediate processing element output.

15. The computer program product of claim 14, wherein:

the adding up of the first group of input activations comprises adding up more than two input activations to produce the first accumulated sum, and the adding up of the second group of weight tensors comprises adding up more than two corresponding weight tensors that correspond, respectively, to the more than two input activations to produce the second accumulated sum.

16. The computer program product of claim 14, wherein the operations further comprise:

mapping different input channels, different filters, or a combination thereof to the input activations so that the different input channels, the different filters, or the combination thereof are fused.

* * * * *